July 7, 1931.  M. M. FISCHER  1,813,533
RADIATOR SCREEN BRACKET
Filed Nov. 22, 1930

INVENTOR
Max M. Fischer
BY
ATTORNEYS

Patented July 7, 1931

1,813,533

UNITED STATES PATENT OFFICE

MAX M. FISCHER, OF BROOKLYN, NEW YORK

RADIATOR SCREEN BRACKET

Application filed November 22, 1930. Serial No. 497,452.

This invention relates to an automobile radiator screen bracket, for securing a radiator screen to the front of a radiator. Screens of the sort referred to are attached to the front of automobile radiators in order to enhance the attractiveness of that portion of the vehicle, and they serve to some extent also as protection for the radiator itself, by standing in the way of stones, insects, etc., which might otherwise injure or clog the radiator and its openings.

An object of the invention is to provide a bracket fastening for the screen such that the screen will be retained securely in position, without the possibility of its coming loose or rattling.

A further object is to provide a bracket fastening such that the screen may readily be attached or removed with the expenditure of a minimum of time and effort.

Another object is to provide a bracket fastening such that the screen may be adjusted vertically and horizontally to the precise position desired.

A still further object of the invention is to provide certain improvements in the form, arrangement and construction of the various parts whereby the above named and other objects may be effectively attained.

Figure 1:
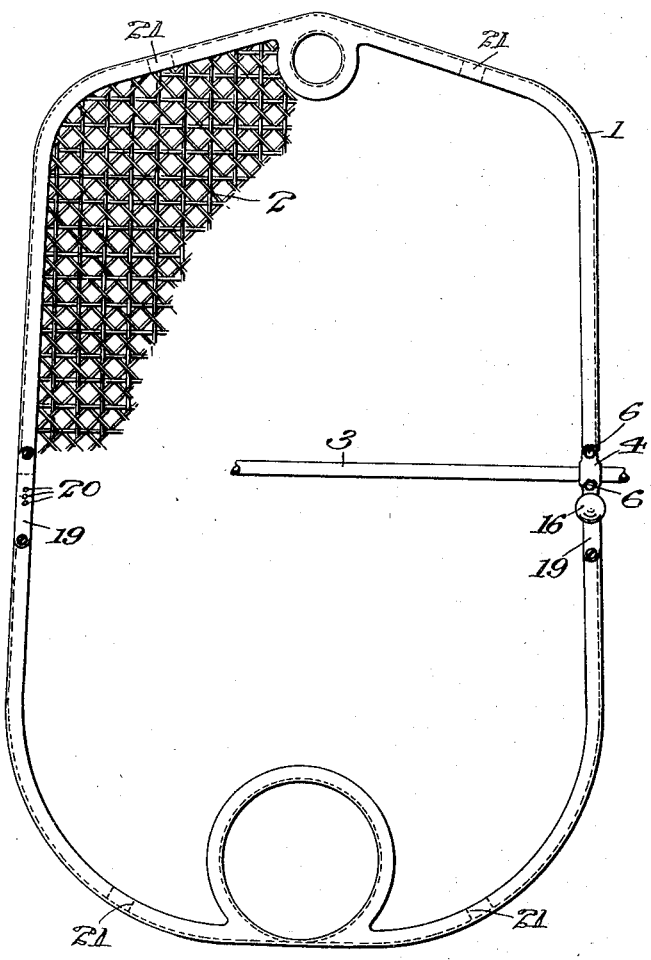
Figure 2:
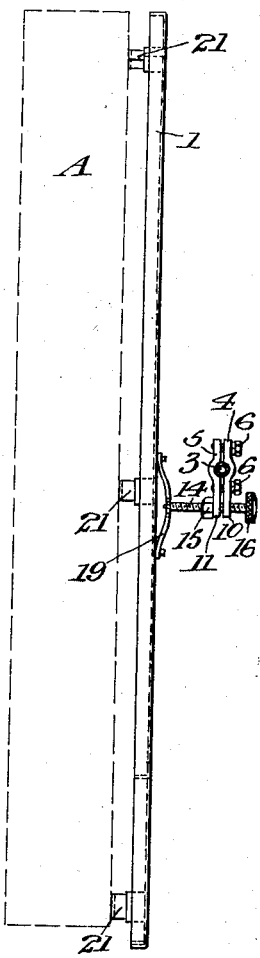
Figure 3:
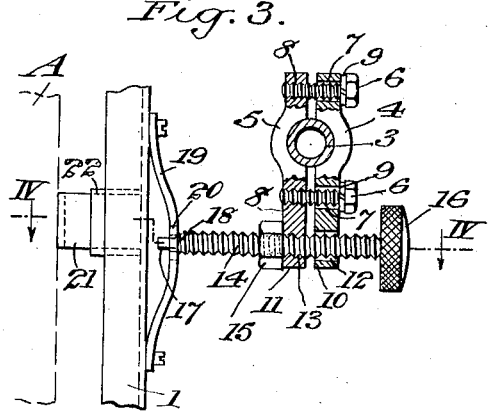
Figure 4:
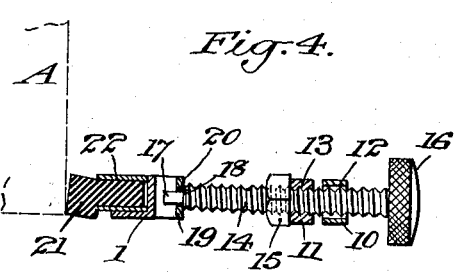

A practical embodiment of the invention is represented in the accompanying drawings, in which Fig. 1 represents a front elevation of a screen and bracket in their operative position, parts being broken away;

Fig. 2 represents a side elevation of a screen and bracket, the position of the radiator shell being indicated generally in broken lines;

Fig. 3 represents a detail side elevation, partly in section, of the bracket and adjacent portions of the screen and radiator shell;

Fig. 4 represents a section along the line IV—IV of Fig. 3, looking in the direction of the arrows.

In the drawings the radiator screen includes a frame 1 of angle material, as shown in Fig. 4, and a mesh portion 2. The screen is customarily shaped to conform generally to the outline of the radiator shell A, but it may obviously depart somewhat therefrom if desired.

A horizontal cross-bar 3 extends across and is spaced somewhat from the front of the radiator of most automobiles and this cross-bar serves conveniently as a support for the screen bracket. The bracket includes an outer clamping member 4, an inner clamping member 5 and a pair of bolts or cap-screws 6. The cap-screws 6 pass freely through holes 7 in the outer clamping member 4 and are threaded into holes 8 in the inner clamping member 5. They may advantageously be provided with lock washers 9 in order to prevent their becoming loosened.

The clamping members 4 and 5 are shown as having extended ends 10 and 11 which are provided with holes 12 and 13. A set screw 14 is arranged to pass freely through the hole 12 and is threaded into hole 13; the set screw carries also a lock-nut 15, and has a head 16 which may conveniently be knurled to facilitate its adjustment by hand. The point of the set screw 14 is shown as including a portion 17 having an appreciably smaller diameter than the body of the screw, and this portion extends from the end of the screw to an abutment or shoulder 18.

To each side of the screen frame 1 is secured a bridge 19, normally of strip metal, bent into the form shown in Figs. 2 and 3 so that its middle portion will be spaced somewhat from the frame itself. In the middle portion of this bridge 19 there are provided one or more openings 20 (three such openings being shown in the present instance), which openings are preferably disposed in a vertical line and are of a size to accommodate the end portion 17 of the screw 14. Since they are smaller in diameter than the body of the screw 14 it follows that the abutment or shoulder 18 will bear against the surface of the bridge and prevent the screw from passing farther into the opening.

At suitable points around the screen frame 1 there may be provided resilient bearing blocks 21 composed, for instance, of rubber and mounted in sockets 22 which are secured, as by welding or soldering, to the inside of the screen frame. These blocks are of such a height that all will bear more or less evenly against the front of the radiator shell A, thereby aiding in retaining the screen in position, as well as tending to prevent rattling thereof. In order to facilitate the equalization of pressure it may be found advantageous to make the blocks 21 at the top and bottom of the screen slightly higher, when the screen is detached, than those in the vicinity of the bridges 19; thus the latter blocks may be forced against the radiator shell A by means of the direct action of the set screws 14, while the natural resiliency of the screen frame 1, together with that of the blocks 21 near the top and bottom thereof, will result in these blocks also being held forcibly against the shell.

Since slight variations are found even in the same models of a single make of automobile it is desirable to arrange for permitting a certain amount of adjustment in the position of the screen with respect to the radiator shell. This is accomplished by means of the provision of more than one opening 20, as already described, whereby the end portion 17 of the screw 14 may be inserted in any selected opening and the desired adjustment in a vertical direction readily be attained. Horizontal adjustment from side to side of the radiator shell is provided by locating the brackets in a proper position upon the crossbar 3, and additional vertical adjustment could be made, in extreme cases, by tilting the brackets forward or backward so as to raise or lower the inner ends 16 of the set screws 14.

The operation of the bracket will be readily apparent from the foregoing description thereof, taken in connection with the drawings.

It will be understood that various changes may be resorted to in the form, construction and arrangement of the various parts without departing from the spirit and scope of my invention; and hence I do not intend to be limited to the details herein shown and described except as they may be included in the claims.

What I claim is:

1. A device of the character described comprising, a clamping element, and a screen-engaging screw carried by the clamping element.

2. A device of the character described comprising, a clamping element, adjustable screen-engaging means carried by the clamping element, and means for securing the screen-engaging means in its adjusted position.

3. A device of the character described comprising, a clamping element, a screen-engaging screw carried by the clamping element, and means for securing the screen-engaging screw in position.

4. A device of the character described comprising, a pair of clamping members, means for securing said members in clamping position, and adjustable screen-engaging means carried by one of said members.

5. A device of the character described comprising, a pair of clamping members, means for securing said members in clamping position, and a screen-engaging screw carried by one of said members.

6. In combination with a radiator shell and radiator screen therefor, a clamping element, adjustable screen-engaging means carried by the clamping element, means on the screen for receiving the screen-engaging means, and means for spacing the screen from the shell.

7. In combination with a radiator shell and radiator screen therefor, a clamping element, a screen-engaging screw carried by the clamping element, means on the screen for receiving the screw, and means for spacing the screen from the shell.

8. In combination with a radiator shell and radiator screen therefor, a clamping element, adjustable screen-engaging means carried by the clamping element, perforated means on the screen for receiving an end of the screen-engaging means, and means for spacing the screen from the shell.

9. In combination with a radiator shell and radiator screen therefor, a clamping element, adjustable screen-engaging means carried by the clamping element, means on the screen for receiving the screen-engaging means, and resilient means for spacing the screen from the shell.

10. In combination with a radiator shell and radiator screen therefor, a clamping element, a screen-engaging screw carried by the clamping element, perforated means on the screen for receiving an end of the screw, and resilient means for spacing the screen from the shell.

11. In combination with a radiator shell and radiator screen therefor, a clamping element, a screen-engaging screw carried by the clamping element, perforated means on the screen for receiving an end of the screw, and resilient means on the screen for spacing the screen from the shell.

12. In combination with a radiator shell and radiator screen therefor, resilient means for spacing the screen from the shell, certain of said means being higher from the normal plane of the screen than other of said means.

13. In combination with a radiator screen, a clamping element, a screen-engaging screw carried by the clamping element, said screw having a reduced end portion, and means on the screen for receiving the reduced end portion of the screw at any one of a plurality of points, whereby the screen may be secured in a corresponding plurality of positions.

In testimony, that I claim the foregoing as my invention, I have signed my name this 21st day of November 1930.

MAX M. FISCHER.